United States Patent
Anderson et al.

(10) Patent No.: US 6,690,868 B2
(45) Date of Patent: Feb. 10, 2004

(54) OPTICAL WAVEGUIDE ARTICLE INCLUDING A FLUORINE-CONTAINING ZONE

(75) Inventors: Mark T. Anderson, Woodbury, MN (US); Craig R. Schardt, Saint Paul, MN (US); James R. Onstott, Dresser, WI (US); Lawrence J. Donalds, Mahtomedi, MN (US); Alessandra O. Chiareli, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 218 days.

(21) Appl. No.: 09/934,388

(22) Filed: Aug. 21, 2001

(65) Prior Publication Data

US 2003/0026565 A1 Feb. 6, 2003

Related U.S. Application Data

(60) Provisional application No. 60/294,740, filed on May 30, 2001.

(51) Int. Cl.$^7$ ............................. G02B 6/02; G02B 6/16
(52) U.S. Cl. ..................................................... 385/123
(58) Field of Search .................. 385/123, 124, 385/125, 126, 127, 128

(56) References Cited

U.S. PATENT DOCUMENTS

| | | | |
|---|---|---|---|
| 3,981,707 A | 9/1976 | Araujo et al. | 65/3 |
| 4,206,968 A | 6/1980 | Suganuma et al. | 350/96.33 |
| 4,772,302 A | 9/1988 | Abe | 65/3.12 |
| 4,852,968 A | 8/1989 | Reed | 350/96.33 |
| 4,859,222 A | 8/1989 | Bauch et al. | 65/3.12 |
| 5,158,587 A | 10/1992 | Kyoto et al. | 65/3.12 |
| 5,235,666 A | 8/1993 | Ooe et al. | 385/144 |
| 5,262,365 A | 11/1993 | Oyobe et al. | 501/54 |
| 5,355,429 A | 10/1994 | Lee et al. | 385/136 |

(List continued on next page.)

FOREIGN PATENT DOCUMENTS

| | | |
|---|---|---|
| EP | 0091738 A2 | 10/1983 |
| EP | 0 443 781 A1 | 8/1991 |
| EP | 0469792 A2 | 2/1992 |
| EP | 0 469 795 A1 | 2/1992 |
| EP | 1 094 346 A1 | 4/2001 |
| EP | 1 174 741 A1 | 1/2002 |
| EP | 1 202 090 A1 | 5/2002 |
| JP | 60263103 | 6/1984 |
| JP | 61191544 | 8/1986 |
| JP | 61222940 | 10/1986 |
| JP | 63248731 | 4/1987 |
| WO | WO89/10332 | 11/1989 |
| WO | WO98/54607 | 12/1998 |
| WO | WO99/04298 | 1/1999 |
| WO | WO99/28255 | 3/1999 |
| WO | WO00/55660 | 9/2000 |
| WO | WO00/58232 | 10/2000 |
| WO | WO 01/92173 A1 | 5/2001 |

OTHER PUBLICATIONS

Dianov, et al., "Application of Reduced–Pressure Plasma CVD Technology to the Fabrication of Er–Doped Optical Fibers", 8397 Optical Materials, Aug. 3, 1994, No. 3, Amsterdam, NE, pp. 181–185.

(List continued on next page.)

Primary Examiner—Javaid H. Nasri
(74) Attorney, Agent, or Firm—Gregg H. Rosenblatt; Alan Ball (57) ABSTRACT

An optical article including a core; at least one cladding layer; and a narrow fluorine reservoir between the core and the cladding layer. The fluorine reservoir has a higher concentration of fluorine than either the cladding layer or the core. One particular embodiment includes a core including a halide-doped silicate glass that comprises approximately the following in cation-plus-halide mole percent 0.25–5 mol % $Al_2O_3$, 0.05–1.5 mol % $La_2O_3$, 0.0005–0.75 mol % $Er_2O_3$, 0.5–6 mol % F, 0–1 mol % Cl.

33 Claims, 6 Drawing Sheets

U.S. PATENT DOCUMENTS

| | | | |
|---|---|---|---|
| 5,381,503 A | 1/1995 | Kanamori et al. | 385/123 |
| 5,778,129 A | 7/1998 | Shukunami et al. | |
| 5,798,306 A | 8/1998 | Dickinson, Jr. | 501/57 |
| 5,809,189 A | 9/1998 | Murphy et al. | 385/43 |
| 5,881,197 A | 3/1999 | Dong et al. | |
| 5,955,388 A | 9/1999 | Dejneka | 501/3 |
| 6,077,799 A | 6/2000 | Dejneka et al. | 501/37 |
| 6,109,065 A | 8/2000 | Atkins et al. | 65/399 |
| 6,128,430 A | 10/2000 | Chu et al. | 385/142 |
| 6,356,694 B1 | 3/2002 | Weber | 385/132 |

OTHER PUBLICATIONS

C. M. Miller, et al., "*Optical Fiber Splices and Connectors: Theory and Methods*", Dekker, New York, Chapter 4, No Date.

P.C. Becker, et al., "*Amplifier Characterization and Design Issues*", Chapter 8, p. 264. No Date.

H. Y. Tam, "*Simple Fusion Splicing Technique for Reducing Splicing Loss Between Standard Singlemode Fibres and Erbium–Doped Fibre*", Electronics Letters, Aug. 15$^{th}$, 1991, vol. 27, No. 17, pp. 1597–1599.

C. P. Botham, "*Theory of Tapering Single–Mode Optical Fibres by Controlled Core Diffusion*", Electronic Letters, No. 24, 1988, pp. 243–244.

J. T. Krause, et al., "*Splice Loss of Single–Mode Fiber as Related to Fusion Time, Temperature, and Index Profile Alteration*", IEEE Journal of Lightwave Technology, LT–4, 1986, pp. 837–840.

M. Onishi, et al, "Dispersion compensating fibre with a high figure of merit of 250ps/nm/dB", *Electronics Letters*, IIE Stevenage, GB, vol. 30, No. 2, Jan. 20, 1994 (pp. 161–163).

John B. MacChesney, et al., "*Depressed Index Substrate Tubes to Eliminate Leaky–Mode Losses in Single–Mode Fibers*", 1985 IEEE, Journal of Lightwave Technology, vol. LT–3, No. 5, Oct. 1985, pp. 942–945.

J. Kirchhof, et al., "*Diffusion Behaviour of Fluorine in Silica Glass*", Journal of Non–Crystalline Solids, 181, 1995, pp. 266–273.

M. Hamada, et al., "Characteristics of Fusion Splice of $Er^{3+}$–Doped Fiber for Optical Amplifier", *Prodeedings of the European Conference on Optical Communication (ECOC) Regular Papers*; Berlin (Sep. 27, 1992); vol. 1, Conference 18; pp. 505–508.

FIG. 10

OPTICAL WAVEGUIDE ARTICLE INCLUDING A FLUORINE-CONTAINING ZONE

RELATED CASES

The present case is related to co-pending, commonly-owned U.S. Provisional Application No. 60/294,740, filed May 30, 2001, entitled, "Optical Waveguide Article Including A Fluorine-Containing Zone", and to co-pending, commonly-owned, U.S. application Ser. No. 09/934,361, entitled "Method of Manufacture of an Optical Waveguide Article Including a Fluorine-Containing Zone", which was filed on the same day as the present application, both of which are hereby incorporated by reference.

BACKGROUND OF THE INVENTION

The present invention relates to optical waveguide articles having a novel optical design and to their manufacture. In particular, the present invention relates to a novel optical fiber and preform including a ring of high fluorine concentration and methods to produce the article, and to core glass compositions.

The term optical waveguide article is meant to include optical preforms (at any stage of production), optical fibers and other optical waveguides. Optical fibers usually are manufactured by first creating a glass preform. There are several methods to prepare preforms, which include modified chemical vapor deposition (MCVD), outside vapor deposition (OVD), and vapor axial deposition (VAD). The glass preform comprises a silica tube. In MCVD different layers of materials are deposited inside the tube; in OVD and VAD different layers are deposited on the outside of a mandrel. The resulting construction typically is then consolidated and collapsed to form the preform, which resembles a glass rod. The arrangement of layers in a preform generally mimics the desired arrangement of layers in the end-fiber. The preform then is suspended in a tower and heated to draw an extremely thin filament that becomes the optical fiber.

An optical waveguide usually includes a light-transmitting core and one or more claddings surrounding the core. The core and the claddings generally are made of silica glass, doped by different chemicals. The chemical composition of the different layers of an optical waveguide article affects the light-guiding properties. For certain applications, it has been found desirable to dope the core and/or the claddings with rare earth materials. However, in rare earth-doped silicates it is difficult to simultaneously achieve high rare-earth ion solubility, good optical emission efficiency (i.e. power conversion efficiency) and low background attenuation, owing to the propensity for rare-earth ions to cluster in high silica glasses.

Introduction of high concentrations of fluorine into the core glass lowers the loss and improves rare earth solubility. Fluorine is used in the core of optical fibers in which the fluorine diffuses out of the core to raise the core index or to provide optical coupling uniformity or mode field diameter conversion.

There are several methods to introduce fluorine into the core of an optical fiber: (1) chemical vapor deposition (CVD), which includes modified chemical vapor deposition (MCVD), outside vapor deposition (OVD), vapor axial deposition (VAD), and surface plasma chemical vapor deposition (SPCVD); (2) solution doping CVD-derived soot with fluoride particles or doping with a cation solution and then providing a source of fluoride (gas or HF solution); (3) sol-gel deposition of a fluoride containing core layer; (4) direct melting techniques with fluoride salts; and (5) gas phase diffusion of fluorine into the core layer before or during collapse.

Each method has drawbacks. For example, method (1), direct incorporation of fluorine by CVD methods, currently is limited to about <2 wt % fluorine unless plasma CVD is used. Deposition conditions generally must be reengineered every time the relative amount of fluorine is changed. In a solution doping embodiment, soot porosity along with the doping solution concentration determine the final glass composition. Constant re-engineering is especially problematic for solution doping where the melting point and viscosity of the glass, and thus soot porosity change rapidly with fluorine concentration.

In method (2), solution doping with fluoride particles may lead to inhomogeneities from particles settling out of solution during the contact period. Exposure of a cation-doped soot to a fluoride containing solution can lead to partial removal of cations owing to resolubilization in the fluoride containing liquid. In the case that a gas is used as a fluoride source, the gas may etch the porous soot and alter the silica to metal ion ratio.

For method (3), sol-gel deposition, drawbacks include the propensity of sol-gel derived layers to crack and flake. If thin layers are used to attempt to avoid these problems, the need arises for multiple coating and drying passes.

For (4), direct melting techniques, drawbacks include the handling of hygroscopic metal salts, many of which present a contact hazard. In addition, there are difficulties uniformly coating a melt on the inside of a tube.

Finally, for method (5), gas phase reactions, the gas may etch some of the silica and change the silica to dopant ion concentration.

Fluorine (in the form of fluoride ions) has a high diffusion coefficient in oxide glasses. Fluorine will rapidly diffuse from a region of higher concentration to lower concentration. The ability of fluorine to rapidly diffuse is utilized to mode match fibers of dissimilar physical core dimensions. Fluorine diffusion out of the core into the cladding layer is used in the production of fiber optic couplers and splitters to improve the uniformity of optical coupling. Fluorine diffusion out of the core also may be used for mode field diameter conversion fiber.

Direct fluorination of the core of a fiber to provide a graded coefficient of thermal expansion (CTE) and viscosity may be beneficial to the optical properties, such as a reduction in the stimulated Brillion scattering.

Also, it is further recognized that the presence of large amounts of fluoride in oxyfluoride glasses is beneficial to prevent phase separation and clustering of rare earth, and also that clustering of fluorescing rare earth ions, such as $Er^{3+}$, has deleterious effects on spectral breadth, excited-state lifetimes, amplification threshold (pump power needed to invert an optical amplifier), and power conversion efficiency of an optical amplifier. Rare-earth-doped aluminosilicate glasses have been doped with fluorine. For example, it has been reported that rare-earth-doped aluminosilicate glass doped with fluorine exhibits remarkable light emission characteristics, including high-gain amplification and broad spectral width.

Fluorine also may be doped into the cladding of optical fiber preforms. Depressed index claddings can, for example, suppress leaky mode losses in single mode fibers. Depressed index clad designs, where the index lowering dopant ions, such as F and B, are in the cladding have been used to control chromatic dispersion, for example.

Preforms may be made from fluorine-containing substrate tubes. Such tubes may be used to form silica core waveguides by diffusion of index lowering species, such as fluorine, out of the inner portion of the tube prior to collapse. In depressed index substrate tubes, there is fluorine in the substrate tube to provide favorable waveguiding properties or to diffuse out of the tube entirely to raise the local index of the innermost region.

DETAILED DESCRIPTION OF THE INVENTION

Figure 1:
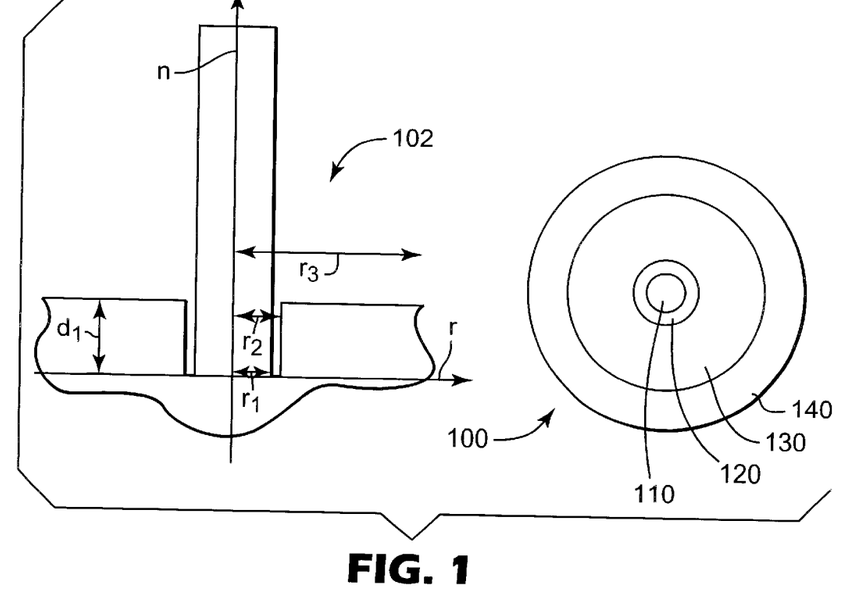
FIG. 1 is a depiction of the refractive index profile and a corresponding schematic cross-section of a first embodiment of an optical waveguide article having a matched-clad depressed-ring (MCDR) design in accordance with the present invention.

FIG. 1 illustrates the refractive index profile depiction and schematic cross-section of a first embodiment of an optical waveguide article 100 in accordance with the present invention. FIGS. 2–6 similarly illustrate the refractive index profile and cross-section of a second, third, fourth, fifth, and sixth embodiment, respectively, of the present invention. Similar elements are identified using reference numerals having the same last two digits. The axes of the refractive index profile depictions for FIGS. 1–6 are distance from center (r) vs. refractive index (n). The axes are unitless and the n-axis is not necessarily intersected at the zero point by the r axis, because the purpose of the Figures is to illustrate the profile shapes and index relations rather than profiles for specific optical articles. Please note that the drawings are for illustrative purposes only, and are not necessarily meant to be to scale. Those skilled in the art will readily appreciate a variety of other designs that are encompassed by the present invention.

The term optical waveguide article is meant to include optical preforms (at any stage of production), optical fibers, and other optical waveguides. FIG. 1 includes a depiction of the refractive index profile 102 and a corresponding schematic cross-section of a first embodiment of an optical waveguide article 100 having a matched-clad depressed-ring (MCDR) design in accordance with the present invention. The article 100 includes a core 110 having a radius $r_1$, a fluorine-containing zone or ring 120 having a radius $r_2$ surrounding and concentric with the core, one or more cladding layers 130 having a radius $r_3$ adjacent to the ring 120 and concentric with the core, and a substrate tube 140 surrounding the cladding layer 130. The cladding 130 is a layer of high purity glass concentric with the core 110. The cladding 130 may be circular, oval, square, rectangular, or other shapes in cross-section. In an optical preform, the substrate tube 140 is a high-silica tube, which is hollow before formation of the inner layers and collapse. The base component of the core 110, the zone 120, and the cladding layers 130 generally also is silica, doped with different chemicals for desired optical characteristics. In alternative embodiments, the cladding layer 130 may include more than one cladding layer.

As explained in more detail in the method of manufacture discussion below, optical fibers are drawn from the optical preforms. The optical fibers maintain the core and cladding arrangement of the preform. Therefore, FIGS. 1–6 also may illustrate the cross-sectional index profile for an optical fiber resulting from a similar optical preform. However, the fluorine zone generally diffuses into the core and/or the cladding, creating a fluorine "zone" rather than a reservoir. In the present and following embodiments, it must be understood that when the fluorine has been diffused, the fluorine concentration zone will be functionally either part of the cladding or core with respect to optical performance.

When the optical article is a preform, the fluorine containing zone 120 acts as a "reservoir" outside of the core from which fluorine may be diffused into the core in subsequent processing steps. The concentration of fluorine in the zone 120 is greater than that in the innermost cladding 130 and the core 110. Optionally, the zone 120 also has an index similar to that of the cladding. In the present invention, the zone 120 allows net diffusion of fluorine into the core from the surrounding glass, not diffusion from the core to the surrounding glass.

The zone 120 also is "optically narrow". The term optically narrow is defined such that the fluorine-ring differential width (outer radius of fluorine ring minus the inner radius of the fluorine ring) is approximately less than ¼ the core diameter and that the presence of the fluorine ring does not significantly negatively impact the waveguiding properties of the final fiber. The inventive article is intended to have optical properties substantially identical to an article of similar design without the fluorine ring, referred to as the standard. Having a similar design is defined as occurring when the difference in the Δ (Δ is the core refractive index minus the refractive index of silica) of the cores of the fibers are less than 5%; the difference in the Δ of the claddings is less than 5%, the core diameters are within 2%, and the cladding diameters (minus the fluorine-ring differential width in the fluorine-ring case) are within 2%.

Negative impact is defined as not being able to simultaneously meet the following specifications in the present inventive fiber as compared to a standard fiber of similar design without the fluorine reservoir: the fundamental mode can propagate at operating wavelength, mode field diameter is 4.5 to 6 microns, background loss at operating wavelength <15 dB/km, and the (second mode) cutoff is less than the amplifier pump wavelength (e.g. for erbium this is either 850–950 nm or <1480 nm, depending on the pump wavelength used for the amplifier).

The present invention includes a method to manufacture optical fiber having a low loss and a uniform distribution of rare earth ions. Such fiber is particularly useful in optical amplification applications, especially in dense wavelength division multiplexing (DWDM) systems.

Introduction of fluorine into aluminosilicates or germano-aluminosilicates provides high gain, wider bandwidth, and ease of splicing to silica glasses. The present invention offers designs with high total rare-earth ion concentrations (e.g. La+Er) in which surprisingly low concentrations of fluorine (>~0.15 wt % (>0.5 mol %)) can provide high rare earth solubility and low background attenuation. Additionally, in a solution-doping/MCVD approach, direct fluorination of the core requires re-engineering the soot deposition and solution doping processes. Thus, the invention provides unexpectedly low-loss rare-earth-doped glass in a manufacturing process compatible with standard solution-doping/MCVD.

In addition, except in the infinite time/temperature limit, direct fluorination of the core gives a different fluorine concentration profile across the fiber than a fluorine ring design. It appears to be quite advantageous to optical properties (esp. loss) and fusability to have a high concentration of fluorine in the core and in the zone between core and cladding. This is a major difference between the present fluorine ring approach and methods (2)–(5) listed above (i.e. solution doping, sol-gel, direct melting, or gas phase reactions during collapse).

An advantage of the present invention over preparing, for example, erbium-doped oxide fiber with no fluorine reservoir, is a reduction of >~3 dB/km in background loss measured at 1200 nm. In an MCVD/solution doping manufacturing process, one major advantage of a fluorine reservoir approach over direct fluorination of the core is that the silica soot does not have to be re-engineered to contain fluorine.

A fiber in accordance with the present invention is readily spliceable and may be prepared with desirable fundamental mode cutoff, acceptable dispersion and mode field diameter, and low polarization mode dispersion. The method and article of the present invention also provide lower viscosity of the glass proximate to the core, and allow lower background attenuation than in depressed-well erbium-doped fiber without a fluorine ring. The invention also provides a method to tailor the fluorine distribution radially. As the diffusion rate of fluorine ions is much greater than that of the rare earth ions, the invention also allows embodiments having a non-equilibrium distribution of rare earth ions in an oxyfluoride glass (i.e. rare-earth-rich regions that can be fluorinated) that would not form from a homogeneous oxyfluoride melt. This can lead to a wider variety of rare earth ion sites in the glass, which contributes to a broader gain spectrum. Broader gain spectra are highly advantageous for DWDM optical amplifiers.

Referring back to FIG. 1, the zone 120 includes glass of high fluorine content proximate to the core 110. The fluorine concentration in the zone 120 is greater than the fluorine concentration in either the core 110 or the cladding 130. Concentration may be measured in mol percent using wavelength dispersive X-ray analysis (WDX) or secondary ion mass spectrometry (SIMS). The zone 120 also is generally narrower than either the core 110 or the cladding 130, and it is designed not to interfere with the optical functioning of either the core 110 or the cladding 130.

In an embodiment of the optical article of FIG. 1, the optical article 100 is single mode optical preform and has a matched-index cladding design ($r_3$) with a thin depressed-index ($d_1$) high-fluorine-content ring ($r_2$) around the core ($r_1$). $d_1$ is the index profile difference between the ring 120 and the cladding 130. It is intended generally that the fluorine ring (reservoir) not substantially impact the waveguiding properties of the fiber. For example, the fundamental mode cutoff still allows single-mode operation in the 1500–1650 nm region and the dispersion profile of the fiber is not significantly changed relative to a control fiber without the fluorine reservoir region.

The zone of high fluorine concentration 120 has a different chemical composition than the cladding 130. However, the reservoir region 120 will still interact with transmitted light and will serve optically as part of the cladding 130, especially in the final fiber after fluorine diffusion has occurred.

In one specific version of the embodiment illustrated in FIG. 1, the fiber has these properties: (1) NA is >0.2, preferably >0.25, (2) the mode field diameter is <6 μm, preferably <5.5 μm, (3) background attenuation measured at 1200 nm is <20 dB/km, preferably <15 dB/km, more preferably <10 dB/km, (4) fundamental mode cutoff is greater than 1800 nm (5) second mode cutoff is <1480 nm, preferably <980 nm. These same fiber specifications also may be used in embodiments of the designs in FIGS. 2–8.

Figure 2:
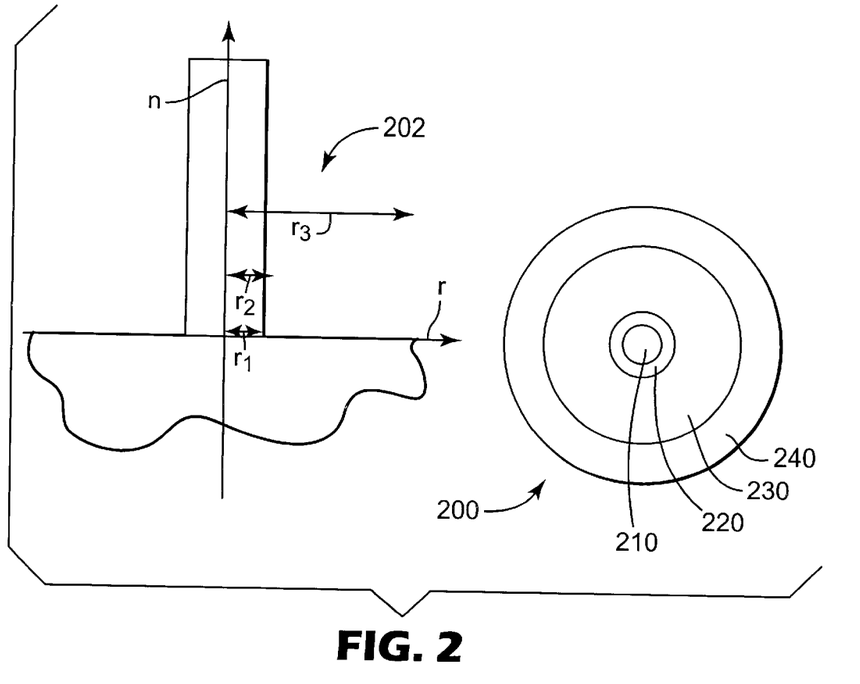
FIG. 2 is a depiction of the refractive index profile and a corresponding schematic cross-section of a second embodiment of an optical waveguide article having a matched-clad matched-ring (MCMR) design in accordance with the present invention.

FIG. 2 is a depiction of the refractive index profile 202 and a corresponding schematic cross-section of a second embodiment of an optical waveguide article 200 having a matched-clad matched-ring (MCMR) design in accordance with the present invention. In an exemplary embodiment, the optical article 200 is a single mode optical preform and has a matched-index cladding 230 ($r_3$) with a thin matched-index high-fluorine-content ring 220 ($r_2$) around the core 210 ($r_1$).

Figure 3:
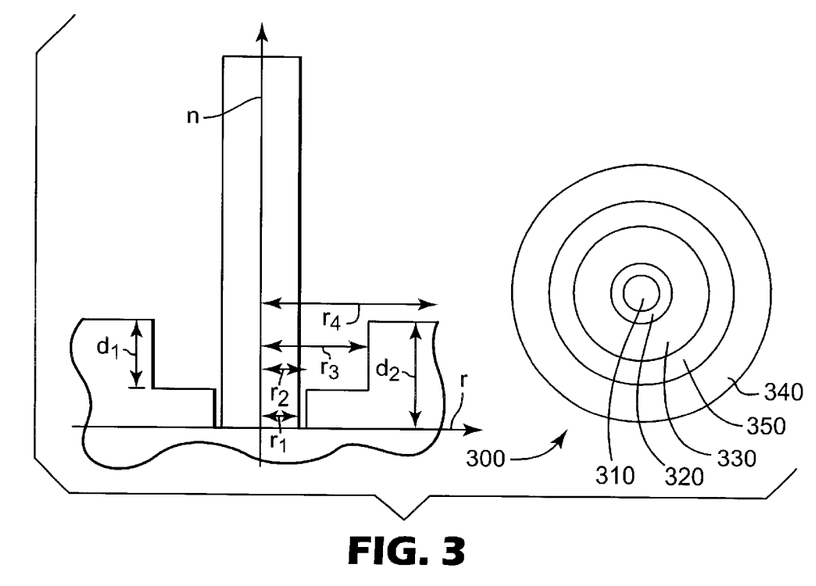
FIG. 3 is a depiction of the refractive index profile and a corresponding schematic cross-section of a third embodiment of an optical waveguide article having a depressed-clad lower-ring (DCLR) design in accordance with the present invention.
Figure 4:
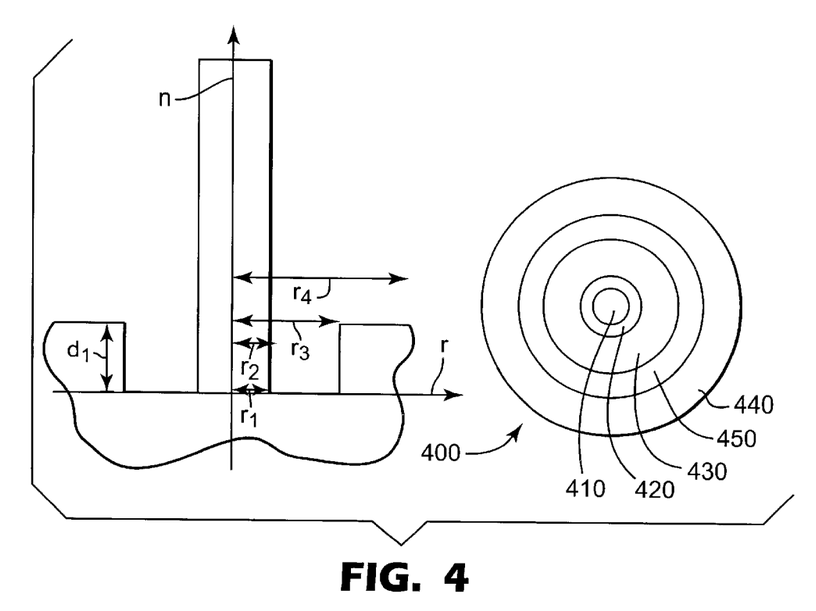
FIG. 4 is a depiction of the refractive index profile and a corresponding schematic cross-section of a fourth embodiment of an optical waveguide article having a depressed-clad depressed-ring (DCDR) design in accordance with the present invention.

FIG. 3 is a depiction of the refractive index profile 302 and a corresponding schematic cross-section of a third embodiment of an optical waveguide article 300 having a depressed-clad lower-ring (DCLR) design in accordance with the present invention. In an exemplary embodiment, the article 300 is single mode optical preform and has a depressed-index ($d_1$) inner cladding 330 ($r_3$) and outer cladding 350 design with a thin further-depressed-index ($d_2$) high-fluorine-content ring 320 ($r_2$) around the core 310 ($r_1$). $d_1$ is the "well depth", that is, index difference of the depressed index for the inner cladding with respect to the outer cladding. $d_2$ is the index difference of the refractive index for the ring with respect to the outer cladding. FIG. 4 is a depiction of the refractive index profile 402 and a corresponding schematic cross-section of a fourth embodiment of an optical waveguide article 400 having a depressed-clad depressed-ring (DCDR) design in accordance with the present invention. In an exemplary embodiment, the article 400 is single mode optical fiber and has a depressed-index inner cladding 430 and matched-index outer cladding 450 design ($r_3$) with a thin depressed-index ($d_2$) high-fluorine-content ring 420 ($r_2$) around the core 410 ($r_1$).

Figure 5:
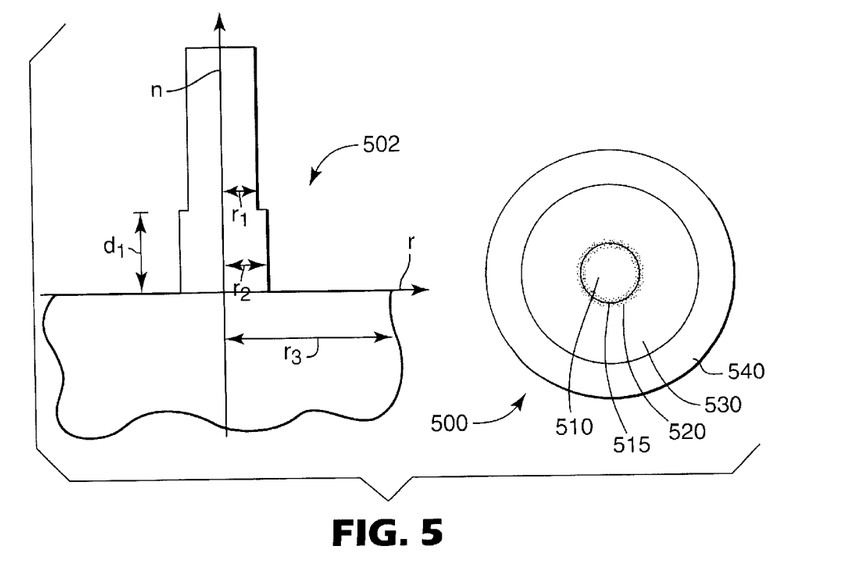
FIG. 5 is a depiction of the refractive index profile and a corresponding schematic cross-section of a fifth embodiment of an optical waveguide article having a matched-clad raised-ring (MCRR) design in accordance with the present invention.

FIG. 5 is a depiction of the refractive index profile 502 and a corresponding schematic cross-section of a fifth embodiment of an optical waveguide article 500 having a matched-clad raised-ring (MCRR) design in accordance with the present invention. The present exemplary article 500 is single mode optical preform and has a matched-index cladding 530 design (r3) with a thin raised-index high-fluorine-content ring 520 (r2) approximately at the core 510/clad 530 interface (r1). The core/clad interface 515 is defined as the radial position where the measured refractive index equals the average of the equivalent step index (ESI) core and ESI clad values.

Figure 6:
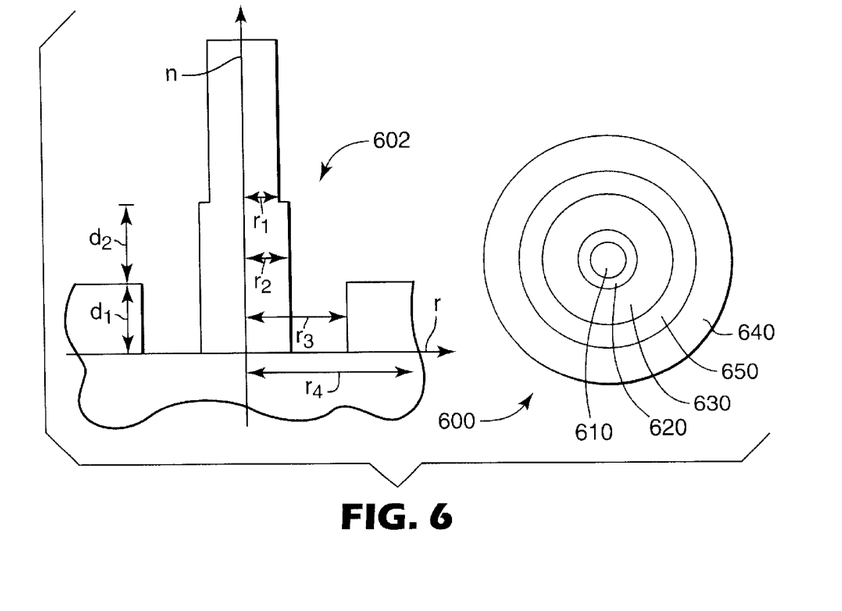
FIG. 6 is a depiction of the refractive index profile and a corresponding schematic cross-section of a sixth embodiment of an optical waveguide article having a depressed-clad raised-ring (DCRR) design in accordance with the present invention.

FIG. 6 is a depiction of the refractive index profile 602 and a corresponding schematic cross-section of an sixth embodiment of an optical waveguide article 600 having a depressed-clad raised-ring (DCRR) design in accordance with the present invention. The exemplary article 600 is single mode optical preform and has a depressed-index inner cladding 630 and matched-index outer cladding 650 ($r_3$) with a thin raised-index ($d_1$) high-fluorine-content ring 620 ($r_2$) approximately at the core/clad interface 610 ($r_1$). The refractive index of the depressed clad 630 and the fluorine ring 620 are essentially matched.

Figure 7:
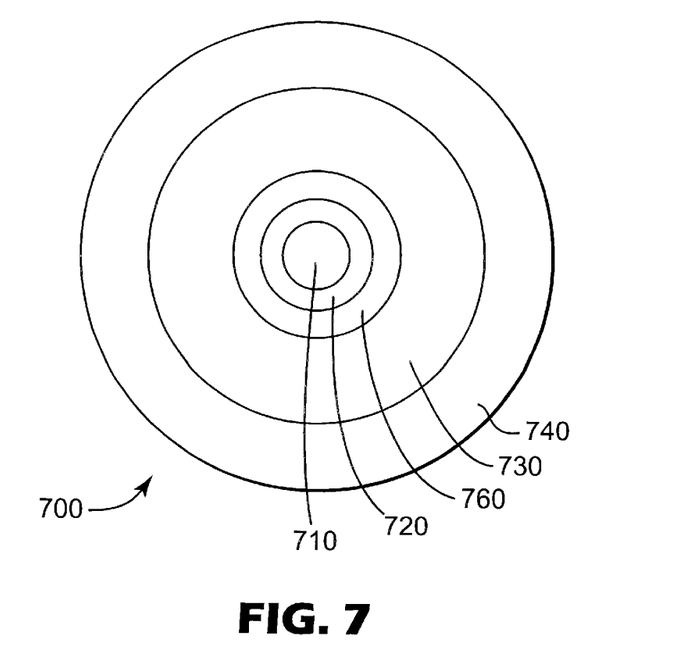
FIG. 7 is a depiction of the schematic cross-section of a seventh embodiment of an optical waveguide article having a barrier layer design in accordance with the present invention.
Figure 8:
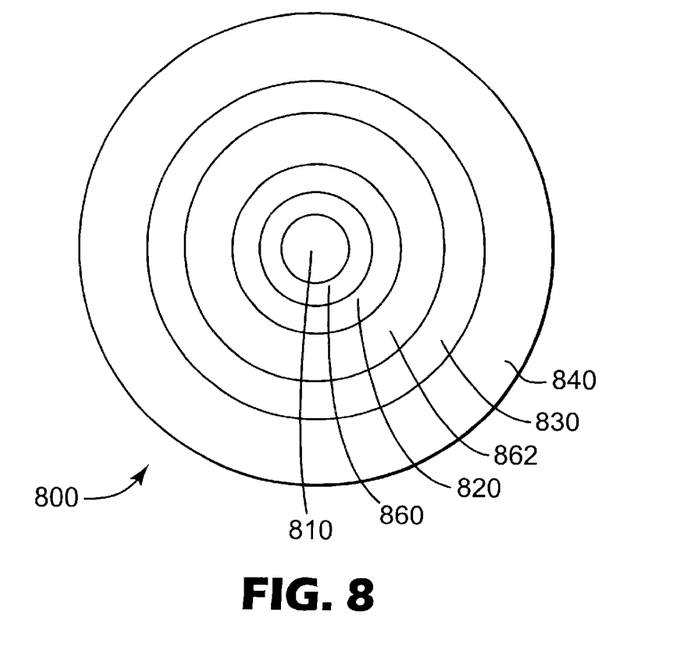
FIG. 8 is a depiction of the schematic cross-section of an eighth embodiment of an optical waveguide article having a double barrier layer design in accordance with the present invention.

In yet another embodiment of an optical preform 700, illustrated in FIG. 7, a diffusion barrier 760, such as a high silica ring, is placed at a distance greater from a core 710 than the proximate fluorine ring 720. The diffusion barrier layer 760 is generally high silica or other material that decreases the diffusion rate of fluorine compared to the diffusion rate of fluorine in the cladding layers. Its purpose is to reduce the diffusion of fluorine into the cladding 730 thereby allowing more of the fluorine in the reservoir 720 to eventually diffuse into the core 710. The diffusion barrier 760 does not substantially impact the waveguiding properties of the fiber.

In contrast with references in which barrier layers have been incorporated into optical fibers to prevent diffusion of loss-raising impurities into regions near the core, the present embodiment uses barrier layers to prevent diffusion of fluorine out of the region near the core, and enhance the amount of fluorine in the core. The diffusion barrier 760 decreases the diffusion of fluorine away from the core and allows more of it to eventually diffuse into the core.

The use of barrier layer and the reservoir concept of the present invention, allows for the crafting of novel embodiments having fluorine diffusion regions. In an alternative embodiment 800, illustrated in FIG. 8, a first barrier layer 860 may be placed in or near the core region 810, exemplarily near the boundary with a zone of high-fluorine concentration 820. The first barrier layer 860 decreases the rate of diffusion of fluorine into the inner portions of the core 810. A second barrier layer 862 may be placed in or near the cladding region 830 to decrease the rate of diffusion of fluorine across the outer portions of the cladding or between cladding layers.

Referring to the embodiments illustrated in FIGS. 1–8, the present invention is particularly useful for forming optical articles having fluorosilicate core glasses. Active rare-earth-doped compositions that contain passive-rare-earths in a fluoroaluminosilicate or fluoroaluminogermanosilicate host with the concentrations of fluorine achievable in our invention are believed to be novel. In one embodiment, the core glass is a fluorosilicate that contains rare earth ions. More preferably, the core glass is a fluorosilicate that contains one or more active rare earth ions. An active rare earth ion is defined as one that exhibits a useful fluoresce in the near infrared (e.g. Yb3+, Nd3+, Pr3+, Tm3+, and/or Er3+). In other embodiments, the fluorosilicate glass contains additional glass forming dopants (e.g. Al, Ge, Sb, and/or Sn) and one or more active rare earth ions. In another embodiment the fluorosilicate glass contains additional glass modifier ions (e.g. Na, Ca, Ti, Zr, and/or rare earths) and one or more active rare earth ions.

One particular optical article according to the present invention includes a core and a concentric cladding in which the core comprises a halide-doped silicate glass that comprises approximately the following in cation-plus-halide mole percent: 85–99 mol % $SiO_2$, 0.25–5 mol % $Al_2O_3$, 0.05–1.5 mol % $La_2O_3$, 0.0005–0.75 mol % $Er_2O_3$, 0.5–6 mol %, F, 0–1 mol % Cl. In another embodiment the glass comprises: 93–98 mol % $SiO_2$, 1.5–3.5 mol % $Al_2O_3$, 0.25–1.0 mol % $La_2O_3$, 0.0005–0.075 mol % $Er_2O_3$, 0.5–2 mol % F, 0–0.5 mol % Cl.

The term cation-plus-halide mole percent (hereafter simply mol %) is defined as: 100 times the number of specified atoms divided by the total number of non-oxygen atoms, as determined by wavelength dispersive X-ray analysis or other suitable technique. For example, to determine the relative amount of silicon atoms in the oxyhalide glass one would divide the number of silicon atoms by the number of silicon plus aluminum plus lanthanum plus erbium plus flourine plus chlorine atoms and multiply the result by 100. To avoid any ambiguity we state the first above compositional ranges in approximate weight percent also: 78.2–99.1 wt % $SiO_2$, 0.4–7.7 wt % $Al_2O_3$, 0.3–7.4 wt % $La_2O_3$, 0.003–4.35 wt % $Er_2O_3$, 0.16–1.7 wt % F, 0–5 wt % Cl. The glass contains oxygen in the requisite amount to maintain charge neutrality. The glass may additionally contain small amounts of hydrogen, for example less than 1 ppm, predominantly in the form of hydroxyl ions and may further contain small amounts of other elements from source materials, in the form of ions or neutral species, for example in concentrations less than 100 ppb.

In yet another embodiment, the fluorosilicate glass contains glass forming dopants and glass modifier ions and an active rare earth ion (e.g. Yb3+, Nd3+, Pr3+, Tm3+, and/or Er3+). In other embodiments, the fluorosilicate glass may contain non-active rare earth modifier ions (e.g. La, Lu, Y, Sc, Gd, or Ce), active rare earth ions, and germanium. In another embodiment the fluorosilicate glass contains non-active rare earth modifier ions, active rare earth ions, and aluminum. The fluorosilicate glass also may contain aluminum, lanthanum, and erbium.

In a specific embodiment used for optical amplification, the core comprises a halide-doped silicate glass that comprises approximately 1.5–3.5 mol % $Al_2O_3$, 0.25–1 mol % $La_2O_3$, 5–750 ppm $Er_2O_3$, 0.5–6.0 mol % F, and 0–0.5 mol % Cl. One particular exemplary embodiment also may further include 0–15 mol % $GeO_2$. In another particular embodiment, the core comprises silicate (SiO2) glass including approximately the following in cation-plus-halide mole percent: 1.5–3.5% $Al_2O_3$, 0.25–1.0% $La_2O_3$, 5–750 ppm $Er_2O_3$, 0.5–2.0% F, 0–0.5% Cl.

Erbium-doped $SiO_2$—$Al_2O_3$; $SiO_2$—$Al_2O_3$—$La_2O_3$; $SiO_2$—$Al_2O_3$—$GeO_2$; and $SiO_2$—$Al_2O_3$—$La_2O_3$—$GeO_2$ glasses are useful in optical amplification. Oxyfluoride compositions of the first type that contain a high concentration of fluorine (e.g. at least 2 wt %), as made by SPCVD, for example, provide broad $Er^{3+}$ emission spectra, and low attenuation. Optical amplifier fibers in accordance with the present invention show unexpected benefits in lanthanum aluminosilicate type glasses from the incorporation of relatively low concentrations of fluorine >0.5 mol % (~0.15 wt %) in the core, namely, a reduction in background attenuation with retention of small mode field diameter, fundamental mode cutoff less than 980 µm, and spliceability to other optical fibers. Since the diffusion rates of fluoride are much greater than those of the rare earth ions, optical fibers in accordance with the present invention allow a non-equilibrium distribution of rare earth ions in an oxyfluoride glass (i.e. erbium and fluorine rich domains) that would not form from a homogeneous oxyfluoride melt. This may lead to a wider variety of rare earth ion sites in the glass, which contributes to a broader gain spectrum, highly advantageous for DWDM optical amplifiers.

Method of manufacture

The present invention further relates to methods of manufacture of an optical waveguide article, including methods to introduce fluorine into the core of the optical fiber by diffusion to modify optical and physical properties of the fiber. More specifically the invention discloses methods to deposit a high concentration of fluorine-containing glass in a region proximate to the core in a fiber preform.

To manufacture an optical waveguide article in accordance with the present invention, a substrate tube, such as tubes 140, 240, 340, 440, 540 and 640, is first provided. The substrate tube generally is a hollow synthetic silica rod, such as those available from General Electric, USA. The tube is cleaned, such as by an acid wash, to remove any foreign matter and is mounted in a lathe for deposition of the inner layers.

The methods to deposit the inner layers are well known, such as MCVD, sol-gel, glass melting and coating. One or more cladding layers are formed. In a particular embodiment, the tube was placed on a CVD lathe. One or more clearing passes may be made to clean and etch the inside of the tube. Gasses were delivered to the inside of the glass tube. A torch, such as a hydrogen/oxygen torch, was traversed along a length of the tube during the clear pass. Flow rates of the gases, flame temperature, and carriage speeds for the torch are computer controlled in accordance with the desired chemical compositions for the manufactured product.

Certain embodiments, such as those illustrated in FIGS. 3 and 4, include an outer cladding layer and an inner cladding layer. Following the clearing pass, the outer cladding is deposited by modified chemical vapor deposition (MCVD). In this process porous glass is deposited on the inner walls of the substrate tube downstream of the burner by thermophoresis. The burner consolidates the deposited glass in the center of the flame. The inner cladding is deposited using a number of passes. The refractive index of the cladding layers may be controlled by the chemical composition in each pass. In one particular embodiment, the innermost cladding comprises 98.5 mol % silica, 0.8 mol % fluorine and 0.7 mol % phosphorus oxide (as $PO_{2.5}$ throughout).

The fluorine ring is applied using one or more passes of the torch while introducing the desired higher concentration of fluorine. The fluorine reservoir region also may contain relatively high contents of index raising dopant (e.g. P) to maintain a matched index. Methods to deposit the fluorine reservoir include, but are not limited to, MCVD, plasma enhanced CVD (PECVD), sol-gel doping, and coating the tube with a melted fluoride glass.

The chemical materials and the concentration of these materials in the reservoir are tailored for different applications and for different desired zones of diffusion. The concentration of fluorine in the core and the cladding also may affect the desired concentration of fluorine in the reservoir. For example, a fluorinated cladding would increase the net inward diffusion of fluorine from the reservoir into the core, by keeping the fluorine concentration in the reservoir high longer. Some fluorine diffusing out into the cladding would be replaced by fluorine diffusing into the reservoir from the cladding (the concentration gradient would be less steep on the outside of the reservoir than on the inside, so the net diffusion rate would be lower on the outside of the reservoir than on the inside.) Additionally, one could also add a diffusion enhancer such as phosphorus oxide to the core region inside the fluorine reservoir, to create a preferential inward diffusion of fluorine.

Fluorine concentration is determined by the relative flows of fluorine precursor vs. other components. In an exemplary embodiment, the fluorine concentration in the fluorine reservoir is at least 30% higher than the fluorine concentration in either the core or the innermost cladding layer. In another design, the fluorine concentration in the fluorine reservoir is at least 50% higher than the fluorine concentration in either the core or the innermost cladding layer. Finally, in yet another design, the fluorine concentration in the fluorine reservoir is at least 100% higher than the fluorine concentration in either the core or the innermost cladding layer.

Some exemplary embodiments include fluorine concentrations in the fluorine reservoir of between at least 0.7 mol % to at least 4.0 mol %. Other exemplary embodiments include even higher fluorine concentrations ranging from greater than 80 mol % silica and less than 20 mol % fluorine, to less than 5 mol % fluorine.

The fluorine reservoir also may comprise phosphorus oxide. The concentration of phosphorus oxide may be approximately equal to, less than, or greater than the concentration of fluorine. One exemplary embodiment includes between less than 1% phosphorus oxide to less than 20% phosphorus oxide. In another exemplary matched index embodiment, the reservoir comprises about 95.7–99.7 mol % silica, about 0.3–4 mol % fluorine and about 0–0.3 mol % phosphorus oxide.

The core may be formed by a variety of methods, including MCVD, solution doping, sol-gel doping, or PECVD.

In various embodiments, the core comprises silica, an active rare earth dopant, and at least one additional component. The additional components may include F and Cl. The additional components of the core also may comprise one or more glass formers or conditional glass formers, such as Ge, P, B, Cl, Al, Ga, Ge, Bi, Se, and Te. The additional components also may comprise one or more modifiers, such as Zr, Ti, rare earths, alkali metals, and alkaline earth metals.

The active rare earth dopant may include rare earth ions that fluoresce in the near infrared (e.g. Yb3+, Nd3+, Pr3+, Tm3+, or Er3+). In addition to the active rare earth dopant, the core also may include one or more of La, Al, and Ge. In one particular embodiment, the Al is less than 10 mol %. In an even more particular exemplary embodiment, the Al concentration is less than 7 mol %. In a particular embodiment, the dopant includes La, in which La is less than 3.5 mol %. In a particular embodiment, the dopant includes Ge, in which Ge is less than 25 mol %.

The core also may include one or more non-active rare earth ions (RE), such as La, Y, Lu, Sc. In one embodiment, the non-active rare earth concentration is less than 5 mol %. In particular embodiments, the composition of the core has molar composition of: $SiO_2$ 75–99%, $Al_2O_3$ 0–10%, $RE_2O_3$ 0–5%.

After deposition of the core, the tube was then consolidated and collapsed into a seed preform.

In one embodiment subsequent thermal processing is performed to adjust the core-to-clad ratio to achieve a desired core diameter in the final fiber. Such subsequent processing may involve multiple stretch and overcollapse steps. The completed preform may then be drawn into an optical fiber. In a particular embodiment, the preform was hung in a draw tower. The draw tower included a torch or furnace to melt the preform, and a number of processing stations, such as for coating, curing and annealing.

The prepared preform is processed, such as by heating, such that a portion of the fluorine in the proximate high fluorine concentration layer diffuses into the core and/or the cladding. The fluorine may diffuse out of the reservoir during collapse, during heat-treatment of the preform, during the stretch/overcollapse process, during the draw of the resulting optical fiber, and/or during a post-treatment of the fiber as an independent step. While diffusing fluorine from, for example, the core to the cladding, has been previously discussed, it is believed that the present invention offers a novel method to diffuse fluorine from a reservoir into the core and/or the cladding before, during, or after draw to reduce loss and improve dopant ion distribution in rare-earth-doped fibers.

Thermal processing of the preform, other than that described above, such as isothermal heating in a tube furnace may be used to further enhance the fluorine content in the core of the fiber or to modify the radial distribution of fluorine. Different chemicals, such as F and P, in the reservoir will diffuse at different rates, so components may form distinct "concentration zones".

Figure 9:
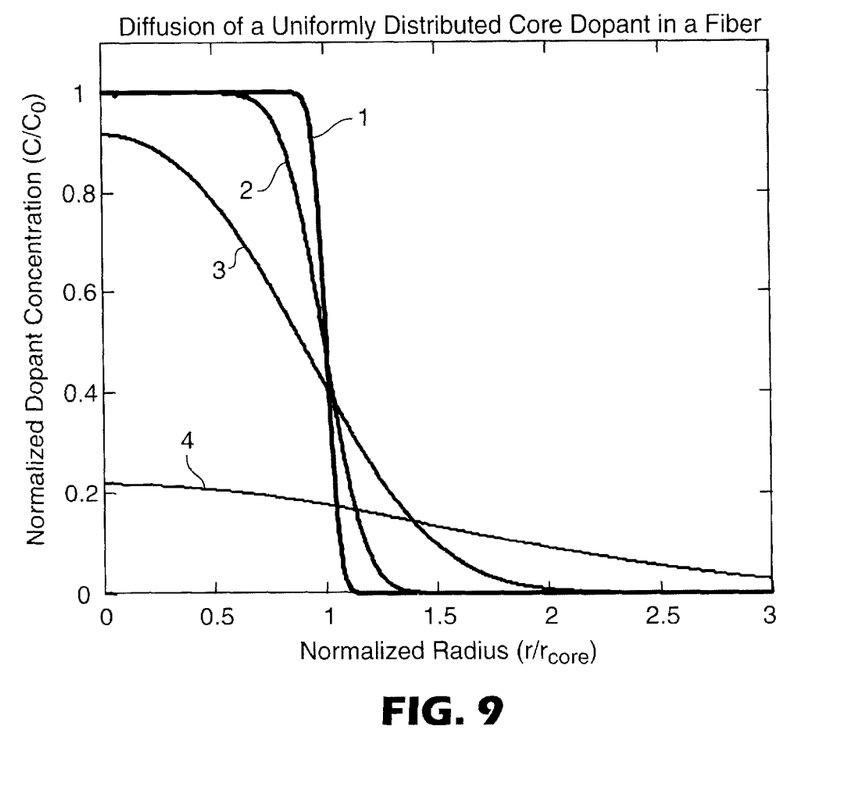
FIG. 9 is a graph of fluorine concentration vs. radial position starting from the center of the core for a preform with an initial uniform fluorine concentration in the core.
Figure 10:
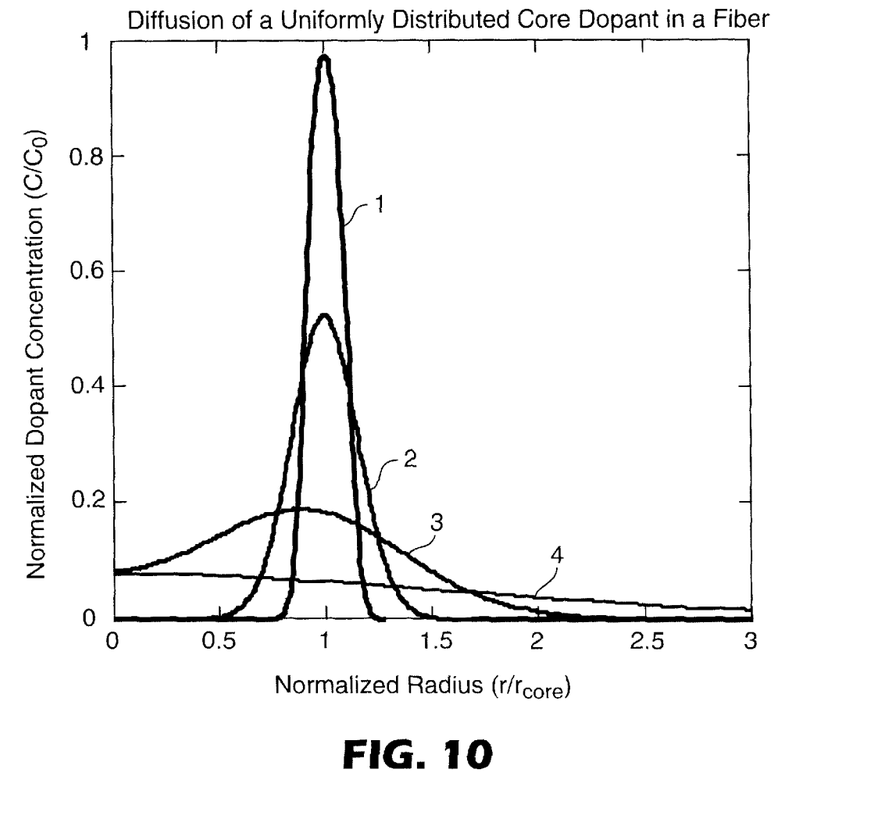
FIG. 10 is a graph of fluorine concentration vs. radial position starting from the center of the core for a preform having a fluorine high concentration ring as described in the present invention.

The graphs in FIGS. 9 and 10 show fluorine concentration as a function of distance from the core for an optical article, a preform or an optical fiber, which has been processed to diffuse fluorine from the fluorine reservoir. The resulting optical article includes a core and a concentric cladding. The core and the cladding are proximate to each other and have a core/clad interface, as defined above. A fluorine concentration zone overlaps at least a portion of the core and the cladding. When the fluorine has been diffused, the physical distribution of the fluorine concentration zone will be, from an optical functionally perspective, part of the cladding and/or the core.

FIG. 9 is a graph of fluorine concentration for differing values of the diffusion time-diffusivity product vs. radial position starting from the center of the core for a preform with an initial uniform fluorine concentration in the core (no fluorine in the cladding). The curves represent concentration profiles for different values of the diffusivity-diffusion time product: (1) Dt=0.001, (2) Dt=0.01, (3) Dt=0.1, (4) Dt=1. In the directly fluorinated case, FIG. 9, (uniformly distributed core dopant), the maximum concentration of fluorine is always at the center of the core.

FIG. 10 is a graph of fluorine concentration for differing values of the diffusion time-diffusivity product vs. radial position starting from the center of the core for a preform having a fluorine high concentration ring as described in the present invention. Again, the curves represent concentration profiles for different values of the diffusivity-diffusion time product: (1) Dt=0.001, (2) Dt=0.01, (3) Dt=0.1, (4) Dt=1. In the fluorine reservoir diffusion design of FIG. 10, the maximum concentration can be tailored from the core/clad interface to the center of the core. This allows a large degree of flexibility in draw conditions and final stress states of the fiber.

The fluorine reservoir in a pre-treated preform according to the present invention is generally placed at the core/clad interface. Accordingly, in most cases, the highest concentration of fluorine for the diffusion treated optical article will be at the interface. However, as illustrated in FIGS. 9 and 10, as the diffusion time increases the distribution of fluorine becomes more normalized. Accordingly, there may be embodiments of treated optical articles in which the fluorine concentration is more evenly distributed across the core and/or the cladding. Alternatively, one may take advantage of the concentric geometry of the core and use the overlap of radial diffusion gradients to create zones of higher fluorine concentration at or proximate the center of the core. Similarly, the speed of diffusion may be different within the core and the cladding, depending on the doping and materials of the different regions, as well as the diffusion treatment steps. Moreover, diffusion barriers may be placed within the core and the cladding to tailor the radial concentration distribution of fluorine.

Using the different tools described by the present invention, a large variety of fluorine concentration profiles may be achieved. In one particular embodiment, the fluorine concentration near the center of the core is higher than the fluorine concentration at the outer edge of the cladding. In another embodiment, the reverse is true, having a higher concentration of fluorine in the cladding than in the center of the core.

EXAMPLES

The present invention may be better understood in light of the following examples:

Example 1

Control

A preform with a depressed index inner clad was fabricated by MCVD techniques. Five deposition passes with $SiF_4$ (flow rates of 30 sccm), $POCl_3$ (100 sccm), and $SiCl_4$ (950 sccm) were made to prepare the inner cladding. The core was erbium-doped lanthanum aluminosilicate. The collapsed preform was sectioned, stretched, and overcollapsed for draw. Fiber was drawn from this preform and measurements were made of the mode field diameter, cutoff wavelength, and loss at 1200 nm. Wavelength dispersive X-ray analysis of the preform drop yielded ~0.3 mol % fluorine in the core and 2.1 mol % fluorine and <0.3 mol % phosphorous in the depressed index inner cladding layer.

Example 2

Fluorine Reservoir

A DCLR preform, having a profile similar to that illustrated in FIG. 3, was fabricated by MCVD techniques. Five deposition passes with $SiF_4$ (30 sccm), $POCl_3$ (100 sccm), and $SiCl_4$ (950 sccm) were made to prepare the inner cladding, and a sixth deposition pass with $SiF_4$ (flow rates of 350 sccm), $POCl_3$ (100 sccm), and $SiCl_4$ (350 sccm) was made to yield a fluorosilicate reservoir region with 4 mol % fluorine. The core was erbium-doped lanthanum aluminosilicate. The collapsed preform was sectioned, stretched, and overcollapsed for draw. The fiber was drawn and characterized in the same manner as in Example 1. Wavelength dispersive X-ray analysis of the preform drop yielded a core with >0.5 mol % (>0.15 wt %) fluorine in the core, a fluorine ring with ~4 mol % fluorine, and an inner cladding with ~2.1 mol % fluorine.

TABLE 1

Comparison of Fibers in Examples 1 and 2

| Fiber type | Fcore (fluorine in the core of the preform drop) | Fring (fluorine in the ring of the preform drop) | Mfd (mode field diameter of fiber) | Cutoff | Bkgd. Loss at 1200 nm |
| --- | --- | --- | --- | --- | --- |
| Control | ~0.3 mol % | N.A. | 5.1 μm | 890 nm | 10.0 dB/km |
| DCLR | >0.5 mol % | ~4 mol % | 5.3 μm | 920 nm | 7.0 dB/km |

The gain shape of the DCLR (having an fluorine ring) fiber shows a slight enhancement of large signal gain in the C-band region. Gain shapes in the L-band are virtually identical.

Example 3

L-band Fiber With and Without Fluorine Reservoir

Fibers suitable for L-band use were fabricated as in examples 1 and 2. Both fibers had the same nominal dopant and modifier cation concentrations. Data on the preforms and fiber are shown below.

TABLE 2

Comparison of Fibers in Example 3

| Fiber type | Fcore (fluorine in the core of the preform drop) | Fring (fluorine in the ring of the preform drop) | Mfd (mode field diameter of fiber) | Cutoff | Bkgd. Loss at 1160 nm |
|---|---|---|---|---|---|
| Control | ~0.3 mol % | N.A. | 5.2 μm | 922 nm | 13.7 dB/km |
| DCLR | >0.5 mol % | ~4 mol % | 5.2 μm | 890 nm | 5.9 dB/km |

Example 4

Comparison of Effect of Thermal Processing on Directly Doped vs Fluorine Reservoir Design Fiber The present invention also provides a method to tailor radially the fluorine distribution. In the present invention we provide a radial distribution of the coefficient of thermal expansion (CTE) and viscosity via diffusion of fluorine into the core from a region outside the core.

The diffusion equation can be solved for the case of diffusion from a distributed source in cylindrical coordinates. The radial coordinate is r, the time is t and the concentration profile is c(r,Dt). The initial concentration, $c_0$, is distributed over the shell from radius $r_1$ to $r_2$. The diffusivity, D, is assumed independent of concentration. A derivation of this equation may be found in *Conduction of Heat in Solids*, by Carslaw and Jaeger, 1948.

$$c(r, Dt) = \frac{c_0}{2Dt}\exp\left(-\frac{r^2}{4Dt}\right)\int_{r_1}^{r_2}\exp\left(-\frac{\rho^2}{4Dt}\right)I_0\left(\frac{r\rho}{2Dt}\right)\rho d\rho$$

Example 5

FiberCAD Calculations on Depressed Clad No Ring and DCLR Designs

With modeling software, such as Fiber_CAD from OPTIWAVE CORPORATION in Ottawa, Canada, using as input preform profiles scaled to fiber dimensions, the optical properties of fibers from two preforms were calculated. The first fiber preform is an ebium-doped depressed well profile. The second is an erbium-doped depressed well with a fluorine ring (DCLR)

| Core diameter (um) | Measured MFD (um) | Calculated MFD (um) | Measured cutoff (nm) | Calculated cutoff (nm) | Calculated Fundamental Mode Cutoff (nm) |
|---|---|---|---|---|---|
| 3.21 | 5.21 | 5.24 | 919 | 780 | 1837 |
| 3.46 | 5.3 | 5.3 | 919 | 790 | 1804 |

The Peterman II mode field diameter is predicted well, but the cutoff wavelength for the LP(1, 1) mode is not. Because of the depressed well design of these fibers, a fundamental mode cutoff occurs and the calculated values are given above. Because of the deeper well of the fluorine pass, a slightly shorter cutoff is predicted for fiber from the fluorine ring preform. The calculations show that a DCLR design does not significantly alter the mode field diameter of the fiber in the operating wavelength range.

Those skilled in the art will appreciate that the present invention may be used in a variety of optical article designs.

While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. An optical article comprising:
   a) a core;
   b) at least one cladding layer;
   c) a narrow fluorine reservoir between the core and the cladding layer;
   d) wherein the fluorine reservoir has a higher concentration of fluorine than the cladding layer and the core.

2. The optical article of claim 1, wherein the at least one cladding layer, the core and the fluorine reservoir each has a refractive index, wherein the refractive index of the fluorine reservoir is less than the refractive index of the at least one cladding layer and the refractive index of the core.

3. The optical article of claim 2, wherein the optical article further comprises a substrate tube surrounding the cladding layer, wherein the substrate tube has a refractive index that substantially matches that of the cladding layer.

4. The optical article of claim 2, wherein the optical article further comprises a substrate tube surrounding the cladding layer, wherein the substrate tube has a refractive index that is greater than that of the cladding layer.

5. The optical article of claim 1, wherein the cladding layer, the core and the fluorine reservoir each has a refractive index, wherein the refractive index of the fluorine reservoir substantially matches the refractive index of the cladding layer, and is less than that the refractive index of the core.

6. The optical article of claim 1, where the optical article is an optical fiber and the core has a higher concentration of fluorine at the edges of the core than the center of the core.

7. The optical article of claim 1, wherein the core comprises silica, fluorine, and one or more rare earth ions.

8. The optical article of claim 7, wherein the rare earth ions are chosen from Sc, Y, La, Ce, Nd, Pr, Sm, Eu, Gd, Tb, Dy, Ho, Er, Tm, Yb, Lu.

9. The optical article of claim 7, wherein the core comprises at least one additional modifier ion.

10. The optical article of claim 7, wherein the core comprises at least one additional glass former ion.

11. The optical article of claim 7, wherein the core comprises at least one additional glass former ion and one additional modifier ion.

12. The optical article of claim 1 wherein the core comprises a halide-doped silicate glass that comprises approximately the following in cation-plus-halide mole per cent: 1.5–3.5 mol % $Al_2O_3$, 0.25–1.0 mol % $La_2O_3$, 0.0005–0.075 mol % $Er_2O_3$, 0.5–2 mol % F, 0–0.5 mol % Cl.

13. The optical article of claim 1, wherein the core comprises a halide-doped silicate glass that comprises approximately the following in cation-plus-halide mole percent 0.25–5 mol% $Al_2O_3$, 0.05–1.5 mol % $La_2O_3$, 0.0005–0.75 mol % $Er_2O_3$, 0.5–6 mol % F, 0–1 mol % Cl.

14. The optical article of claim 1, wherein the core further comprises a rare earth ion, lanthanum and aluminum.

15. The optical article of claim 1, wherein the core further comprises a rare earth ion, germanium and aluminum.

16. The optical article of claim 1, wherein the core further comprises a rare earth ion, germanium, aluminum, and lanthanum.

17. The optical article of claim 1, wherein the optical article is an optical fiber preform.

18. An optical system including the optical article of claim 1.

19. The optical article of claim 17, wherein the preform has a DCRR design.

20. The optical article of claim 17, wherein the preform has an MCDR design.

21. The optical article of claim 17, wherein the preform has an MCMR design.

22. The optical article of claim 17, wherein the preform has a DCLR design.

23. The optical article of claim 17, wherein the preform has a DCDR design.

24. The optical article of claim 17, wherein the preform has a MCRR design.

25. An optical fiber comprising:
a) a core;
b) a concentric cladding, the core and the cladding having a core/clad interface; and
c) a fluorine concentration zone extending from the core/clad interface of the core and the cladding and overlapping across at least a portion of the core and the cladding, the zone comprising a highest concentration of fluorine approximately at the core/clad interface.

26. An optical system including the fiber of claim 25.

27. The optical fiber of claim 25, the core having a center, wherein the fluorine concentration near the center of the core is higher than the fluorine concentration proximate the outer edge of the cladding.

28. The optical fiber of claim 25, wherein the concentration of fluorine in the cladding is higher than the concentration of fluorine in the core.

29. The optical fiber of claim 25, wherein the zone does not substantially impact the waveguiding properties of the fiber.

30. The optical fiber of claim 25, wherein the optical fiber is a single mode, matched index cladding design.

31. The optical fiber of claim 25, wherein the cladding and the zone each have an index of refraction and the indexes are essentially matched.

32. The optical fiber of claim 25, wherein the optical fiber is a rare earth doped fiber for optical signal amplification.

33. The optical fiber of claim 25, wherein the optical fiber is a rare earth doped fiber.

* * * * *

UNITED STATES PATENT AND TRADEMARK OFFICE
CERTIFICATE OF CORRECTION

PATENT NO. : 6,690,868 B2
DATED : February 10, 2004
INVENTOR(S) : Anderson, Mark T.

It is certified that error appears in the above-identified patent and that said Letters Patent is hereby corrected as shown below:

Column 12,
Line 28, delete "2.1 mol%" and insert -- ~2.1 mol % -- therefor.

Column 14,
Line 31, after "layer;" insert -- and --.

Signed and Sealed this

Ninth Day of November, 2004

JON W. DUDAS
*Director of the United States Patent and Trademark Office*